(12) United States Patent
Lee et al.

(10) Patent No.: US 7,982,366 B2
(45) Date of Patent: Jul. 19, 2011

(54) ULTRASOUND TRANSDUCER WITH A DUMBBELL-SHAPED CHAMBER

(75) Inventors: Chih-Kung Lee, Taipei (TW);
Wen-Jong Wu, Taipei (TW);
Chih-Chiang Cheng, Changhua (TW);
Chia-Yu Lin, Taipei (TW); Jen-Hsuan Ho, Taipei (TW); Chuin-Shan Chen, Taipei (TW); Jay Shieh, Taipei (TW);
Wen-Hsin Hsiao, Lungtan Hsiang (TW)

(73) Assignees: Tung Thih Electronic Co., Ltd., Taoyuan Hsien (TW); National Taiwan University, Taipei (TW)

( * ) Notice: Subject to any disclaimer, the term of this patent is extended or adjusted under 35 U.S.C. 154(b) by 214 days.

(21) Appl. No.: 12/316,698

(22) Filed: Dec. 16, 2008

(65) Prior Publication Data
US 2010/0148633 A1    Jun. 17, 2010

(51) Int. Cl.
*H01L 41/053* (2006.01)
(52) U.S. Cl. .................. 310/322; 310/334; 310/348
(58) Field of Classification Search ................ 310/322, 310/334, 335, 348
See application file for complete search history.

(56) References Cited

U.S. PATENT DOCUMENTS
2003/0235115 A1   12/2003   Porzio

FOREIGN PATENT DOCUMENTS

| DE | 19917862 | 11/1999 |
|---|---|---|
| EP | 1283516 | 2/2003 |
| JP | 2001013239 | 1/2001 |
| JP | 20072402611 | 9/2007 |

OTHER PUBLICATIONS

Machine Translation of JP2001-013239 generated by the website of the Japanese Patent Office.*
European Search Report dated Jul. 14, 2009, Appln. No. EP 09 15 3254.

* cited by examiner

*Primary Examiner* — Derek J Rosenau
(74) *Attorney, Agent, or Firm* — William E. Pelton, Esq.; Cooper & Dunham LLP (57) ABSTRACT

An ultrasound transducer has a cup-shaped casing. The cup-shaped casing has a sidewall. A cross section of an inner surface of the sidewall being perpendicular to a central axis of the ultrasound transducer substantially shows a dumbbell-shaped contour. The dumbbell-shaped contour has a pair of opposite straight-line sections being substantially parallel to a longitudinal axis of the dumbbell-shaped contour and a pair of opposite arc sections being located respectively at two ends of the longitudinal axis of the dumbbell-shaped contour and respectively forming two enlarged portions of the dumbbell-shaped contour. Two ends of each arc section of the dumbbell-shaped contour respectively joint the straight-line sections through two curve sections and each curve section is connected to one end of the arc section and one straight-line section. At least one enlarged area of a dumbbell-shaped surface of an inside bottom surface has a recessed portion.

3 Claims, 13 Drawing Sheets

ULTRASOUND TRANSDUCER WITH A DUMBBELL-SHAPED CHAMBER

BACKGROUND OF THE INVENTION

1. Field of the Invention

The present invention relates to an ultrasound transducer, and more particularly to an ultrasound transducer that is used for detecting the existence of an object or measuring the distance between the object and the ultrasound transducer. More particularly, the present invention relates to an ultrasound transducer that has the best-optimized structure for wide ultrasound wave transmission extent.

2. Description of Related Art

Ultrasound transducers are used for various applications that need to detect objects. Typical applications of the ultrasound transducers include detection and range finding of the targeted objects. For instance, obstacle detection for the tail of an automobile through the ultrasound waves is a common application. In many applications, the ultrasound transducers employ the piezoelectric elements to generate ultrasound waves for the aforementioned detecting functions. In most circumstances, the same ultrasound transducer is usually used as an ultrasound transmitter and an ultrasound receiver. In other words, the same ultrasound transducer is deemed a dual-function device that implements both ultrasound wave transmission for scanning and/or range finding purposes and reflected ultrasound wave receipt.

In both transmitting and receiving operation modes, the shapes of the transmitting and receiving fields of an ultrasound transducer always greatly affect the applications of the ultrasound transducer. For instance, in the purpose monitoring the nearby surroundings around the tail of an automobile, both the ultrasound coverage fields of transmitting and receipt need to be shaped appropriately to achieve the best operation. Generally, both the transmitting and receipt coverage fields need a wide horizontal extent shaping and a narrow vertical extent shaping. The wide horizontal coverage field pattern efficiently increases the effectively monitoring angular extent. The narrow vertical coverage field pattern efficiently reduces interference of reflected ultrasound waves.

The shape of the coverage field under the receiving operation mode of an ultrasound transducer for an automobile tail monitoring system is required to be substantially identical or similar to that under the transmitting operation mode thereof. For applications on cameras or the like, the same requirement is needed.

To reach the aforementioned requirements, a conventional method is increases the operation frequency extent to reduce the vertical coverage field pattern, which probably reduces the horizontal coverage field pattern disadvantageously. Thus, the horizontal detection blind zone increases. Therefore, the method cannot completely conform to the requirements.

Another conventional method is to change and adjust the shape design of a cup-shaped casing of the ultrasound transducer to form various internal opening such as rectangular, elliptical, trapezoidal and teardrop-like cross sections, which intends to achieve the desirable ultrasound coverage fields. However, the ultrasound transducers do not maintain a sufficient horizontal coverage field while effectively reducing the vertical coverage field.

Figure 1A:
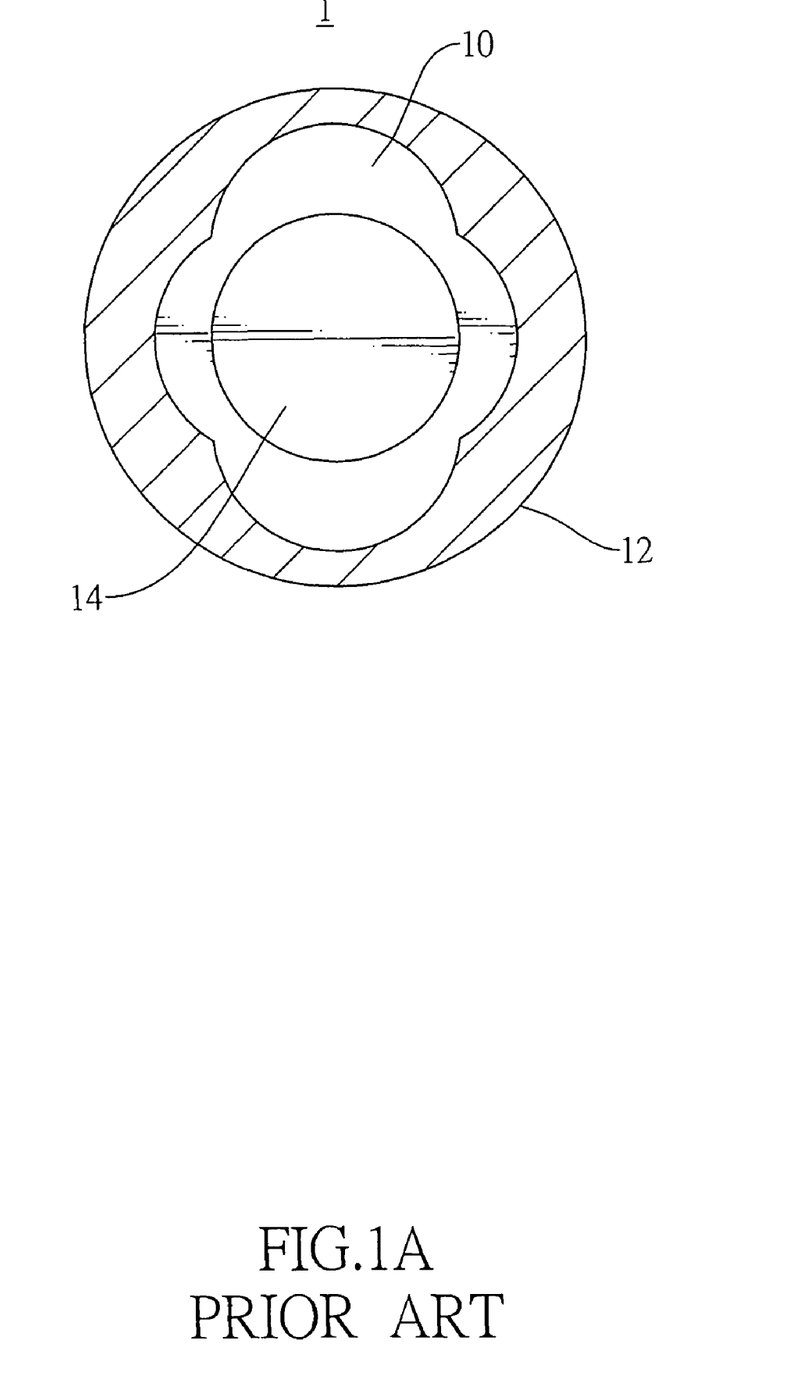
FIG. 1A is a cross sectional top view of a conventional ultrasound transducer in accordance with the prior art.
Figure 1B:
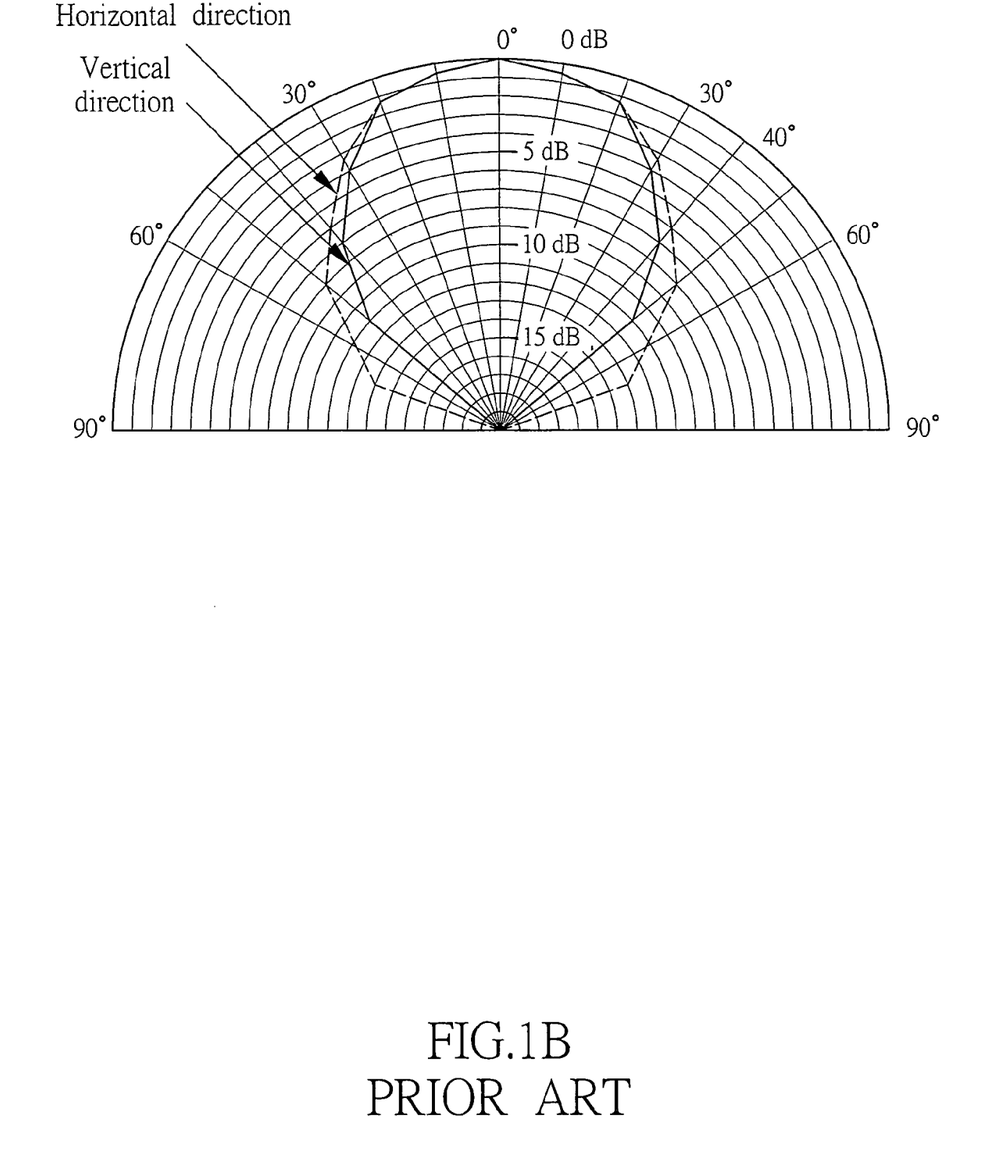
FIG. 1B is a diagram of ultrasound coverage field pattern distributions in horizontal and vertical directions of the conventional ultrasound transducer in FIG. 1A.

For instance, FIG. 1A shows a cross sectional view of an ultrasound transducer disclosed in JP Patent No. 9-284896. In FIG. 1A, the ultrasound transducer (1) has a cup-shaped casing (12) and an internal opening (10) defined in the cup-shaped casing (12). The internal opening (10) has a cross section being similar to two intersecting ellipses. A piezoelectric element (14) is mounted in a bottom of the cup-shaped casing (12). With reference FIG. 1B, the ultrasound coverage field pattern distributions in horizontal and vertical directions are 54 degrees and 50 degrees at −3 dB. Although using such cup-shaped casing (12) widens the horizontal ultrasound coverage field and narrows the vertical ultrasound coverage field, the shape of the vertical ultrasound coverage field is undesirable.

To overcome the shortcomings, the present invention provides an ultrasound transducer with a dumbbell-shaped chamber to mitigate or obviate the aforementioned problems.

SUMMARY OF THE INVENTION

The main objective of the invention is to provide an ultrasound transducer that is used for detecting the existence of an object or measuring the distance between the object and the ultrasound transducer. More particularly, the present invention relates to an ultrasound transducer that has the best-optimized structure for wide ultrasound wave transmission extent.

An ultrasound transducer in accordance with present invention comprises a cup-shaped casing. The cup-shaped casing has a sidewall. A cross section of an inner surface of the sidewall being perpendicular to a central axis of the ultrasound transducer substantially shows a dumbbell-shaped contour. The dumbbell-shaped contour has a pair of opposite straight-line sections being substantially parallel to a longitudinal axis of the dumbbell-shaped contour and a pair of opposite arc sections being located respectively at two ends of the longitudinal axis of the dumbbell-shaped contour and respectively forming two enlarged portions of the dumbbell-shaped contour. Two ends of each arc section of the dumbbell-shaped contour respectively joint the straight-line sections through two curve sections and each curve section is connected to one end of the arc section and one straight-line section. At least one enlarged area of a dumbbell-shaped surface of an inside bottom surface has a recessed portion.

Other objectives, advantages and novel features of the invention will become more apparent from the following detailed description when taken in conjunction with the accompanying drawings.

DETAILED DESCRIPTION OF THE PREFERRED EMBODIMENT

Figure 2A:
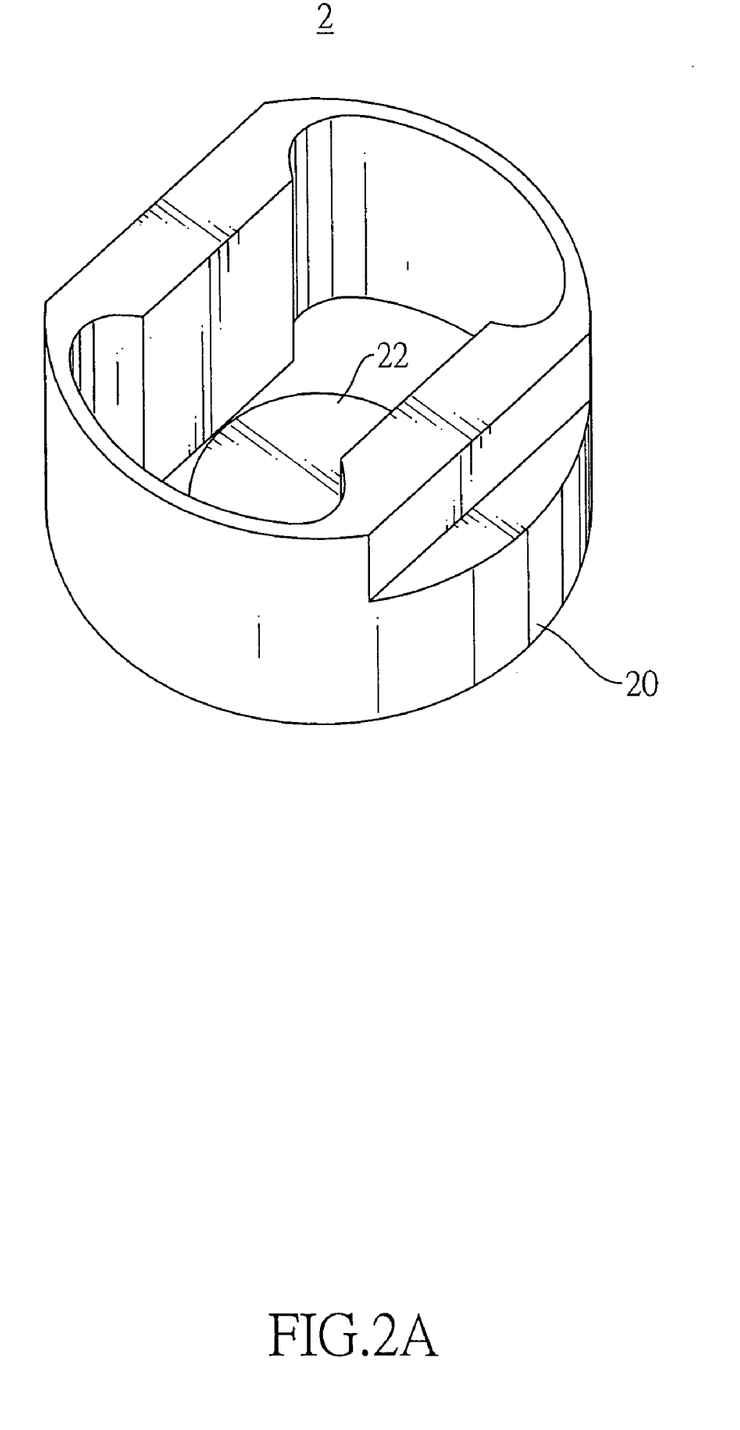
FIG. 2A is a perspective view of a first embodiment of an ultrasound transducer in accordance with the present invention.
Figure 2B:
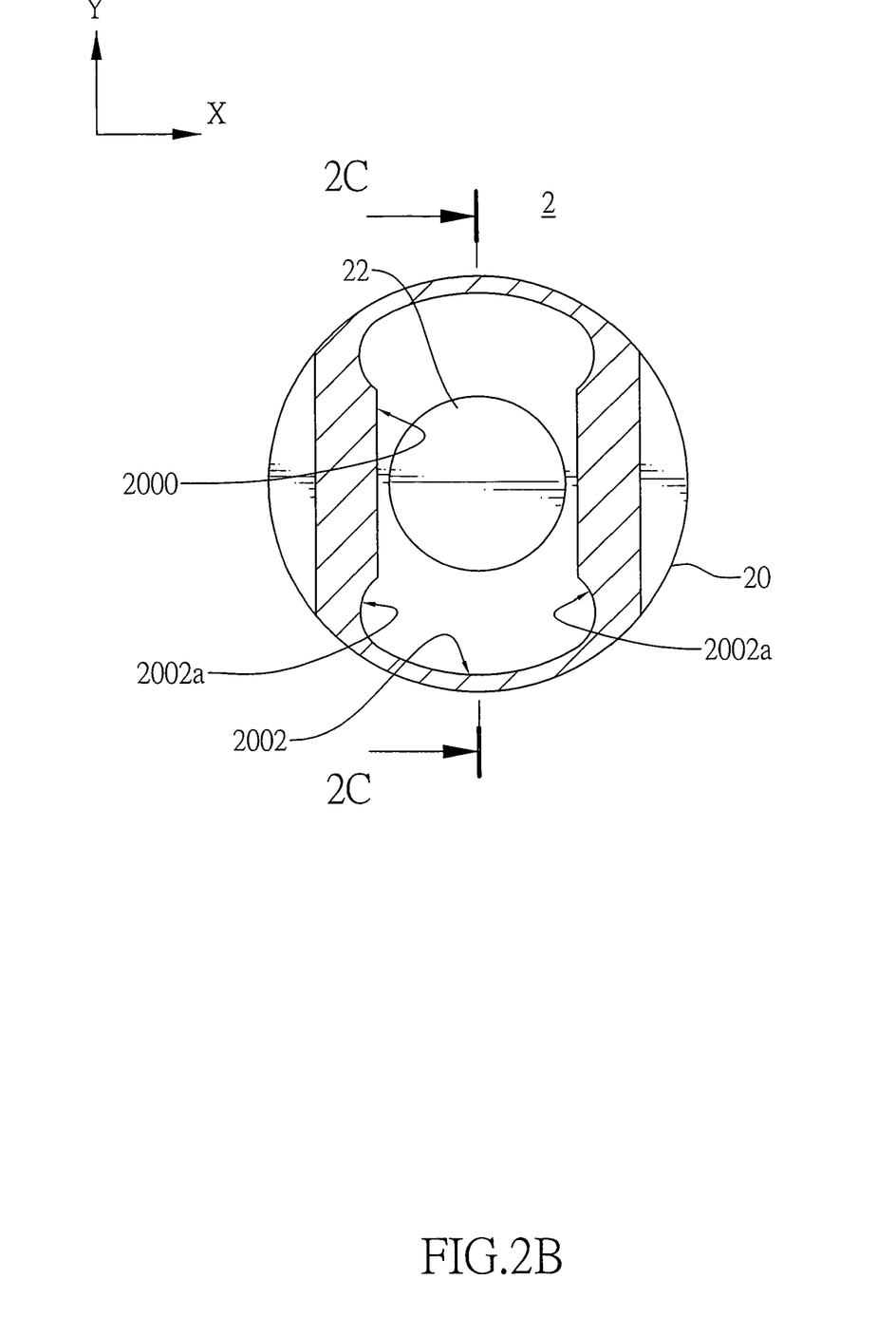
FIG. 2B is a cross sectional top view of the ultrasound transducer in FIG. 2A.
Figure 2C:
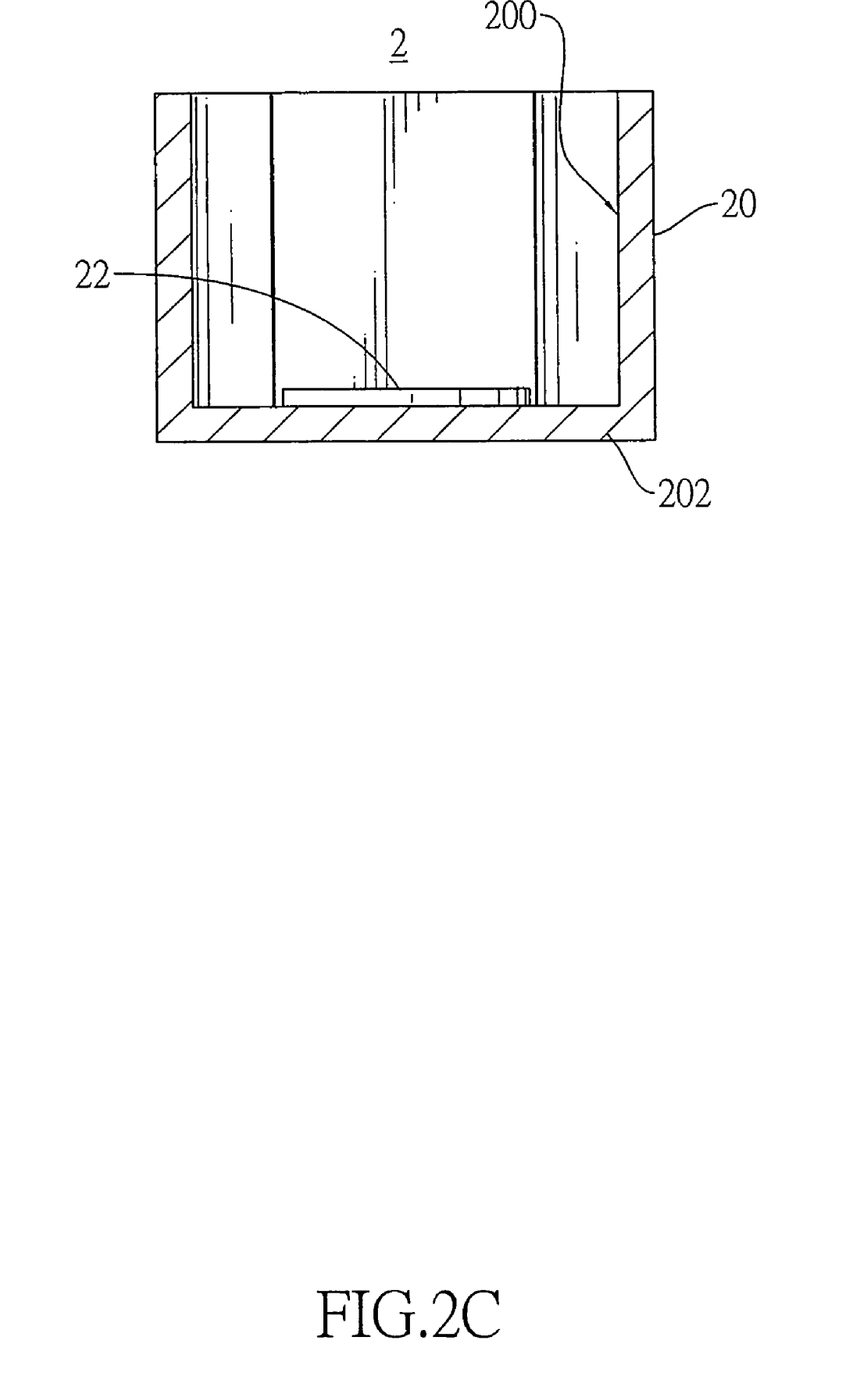
FIG. 2C is a cross sectional side view of the ultrasound transducer along line 2C-2C in FIG. 2B.

FIG. 2A shows a perspective view of a first embodiment of an ultrasound transducer (2) in accordance with the present invention. FIG. 2B shows a cross sectional top view of the ultrasound transducer (2) in FIG. 2A. FIG. 2C shows a cross sectional side view of the ultrasound transducer (2) along line 2C-2C in FIG. 2B. With reference to FIGS. 2A-2C, the ultrasound transducer (2) comprises a cup-shaped casing (20) and a piezoelectric element (22). The cup-shaped casing (20) serving as a main structure of the ultrasound transducer (2) substantially comprises a cylindrical and straight-tubular-cup-shaped structure.

As implied by the description of the cup-shaped casing (20), the cup-shaped casing (20) looks like a teacup and has an opening and a bottom (202). A sidewall (200) of the cup-shaped casing (20) is a straight cylinder substantially having a uniform diameter. However, as comprehended by the person of ordinary skill in the art, the sidewall (200) of the cup-shaped casing (20) may be non straight-cylinder-shaped and may be tapered from the bottom (202) to the opening or tapered from the opening to the bottom (202).

A symmetrical central axis of the cylindrical structure of the cup-shaped casing (20) substantially corresponds to an axis of transmitting and/or receiving ultrasound waves and the opening departs from an ultrasound transmitting direction of the ultrasound transducer (2). The bottom (202) of the cup-shaped casing (20) is flat and substantially perpendicular to the central axis of the cup-shaped casing (20). The sidewall (200) of the cup-shaped casing (20) surrounds the central axis. The bottom (202) and the sidewall (200) connect together to form the cup structure of the cup-shaped casing (20).

With reference to FIGS. 2A and 2B, the sidewall (200) surrounding a space of the cup-shaped casing (20) substantially has an outer surface being cylindrical except for a part of the outer surface adjacent to the opening. In another aspect, the sidewall (200) has an inner surface surrounding the space. The inner surface has a dumbbell-shaped contour when observed along the central axis. The space communicates with the opening.

In other words, when the cup-shaped casing (20) is cut along a plane perpendicular to the central axis to form a cross section of an inner surface of the sidewall (200), the cross section substantially shows a closed dumbbell-shaped contour. With reference to FIG. 2B, when the axis of the ultrasound transducer (2) serves as the symmetrical central axis, the dumbbell-shaped contour of the inner surface of the sidewall (200) has a pair of opposite straight-line sections that are substantially parallel to a longitudinal axis of the dumbbell-shaped contour. The straight-line sections stretch along the central axis to form two opposite flat surfaces (2000) of the inner surface of the sidewall (200).

Furthermore, the dumbbell-shaped contour of the sidewall (200) has a pair of opposite arc sections. The arc sections are located respectively at two ends of the longitudinal axis of the dumbbell-shaped contour and respectively form two enlarged portions of the dumbbell-shaped contour. The arc sections stretch along the central axis to form two opposite concave surfaces (2002) of the sidewall (200).

Moreover, two ends of each arc section of the dumbbell-shaped contour respectively joint the straight-line sections through two curve sections. Each curve section is connected to one end of the arc section and one straight-line section. The curve sections on each arc section stretch along the central axis to form two opposite grooves (2002a). Total four grooves (2002a) are formed from the four curve sections.

An outside bottom surface of the bottom (202) of the cup-shaped casing (20) is a substantially circular plane surface. An inside bottom surface of the bottom (202) facing the opening of the cup-shaped casing (20) is substantially a flat and dumbbell-shaped surface, as clearly shown in FIG. 2B. In general, the piezoelectric element (22) is mounted substantially on a center of the inside bottom surface of the bottom (202).

Figure 2D:
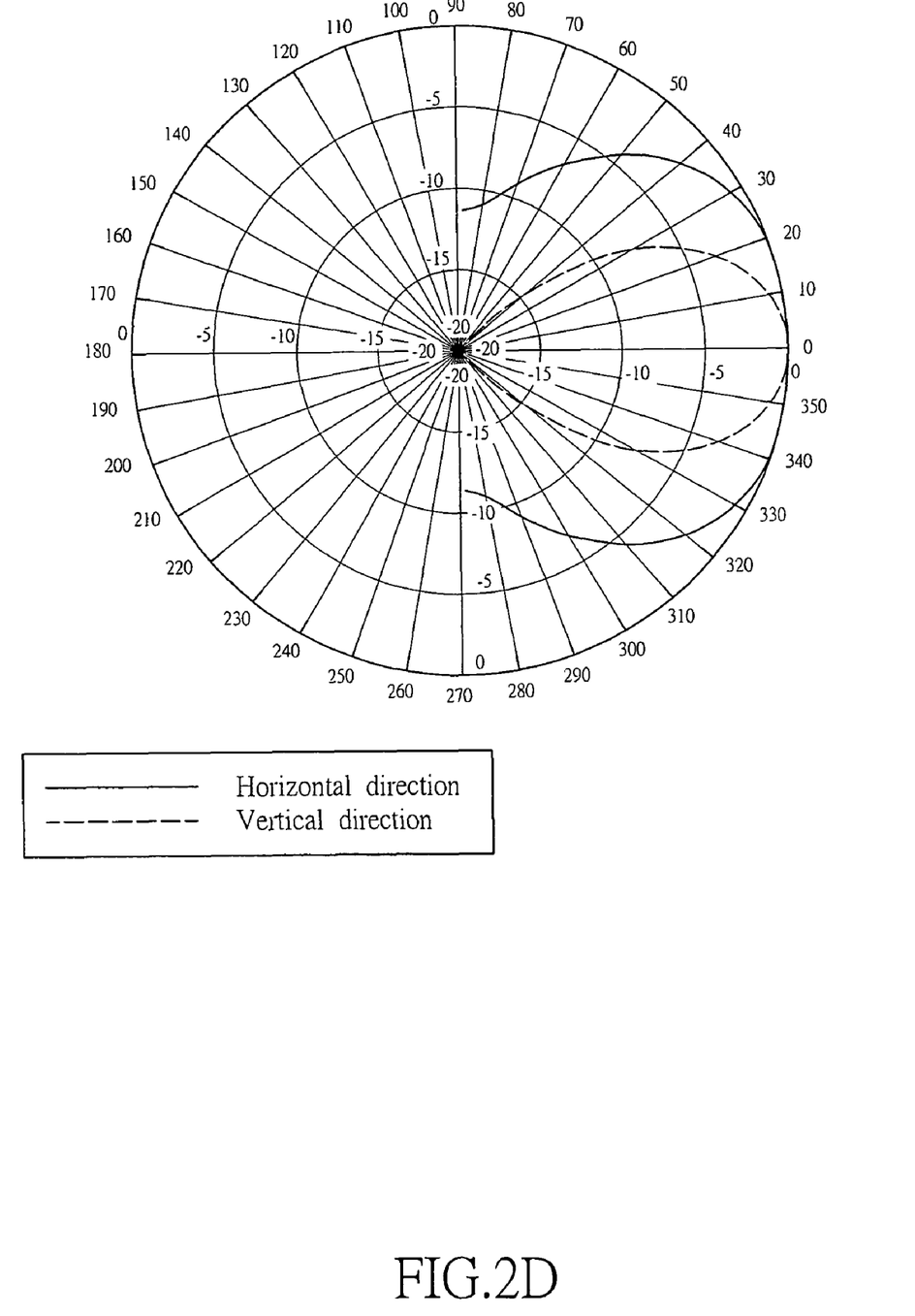
FIG. 2D is a diagram of the ultrasound coverage field pattern distributions in horizontal and vertical directions of the ultrasound transducer in FIGS. 2A-2C.

FIG. 2D shows ultrasound coverage field pattern distributions of the ultrasound transducer in horizontal and vertical directions in FIGS. 2A-2C. At the value of −3 dB, the ultrasound coverage field pattern distribution in the horizontal direction is 88 degrees (+44 to −44 degrees) and the ultrasound coverage field pattern distribution in the vertical direction is 40 degree. The ultrasound transducer of the present invention has the wider horizontal ultrasound coverage field pattern distribution and the narrower vertical ultrasound coverage field pattern distribution when compared to an conventional ultrasound transducer disclosed in JP Patent No. 9-284896. Therefore, the present invention has improvement when compared to the conventional ultrasound transducer.

Figure 3A:
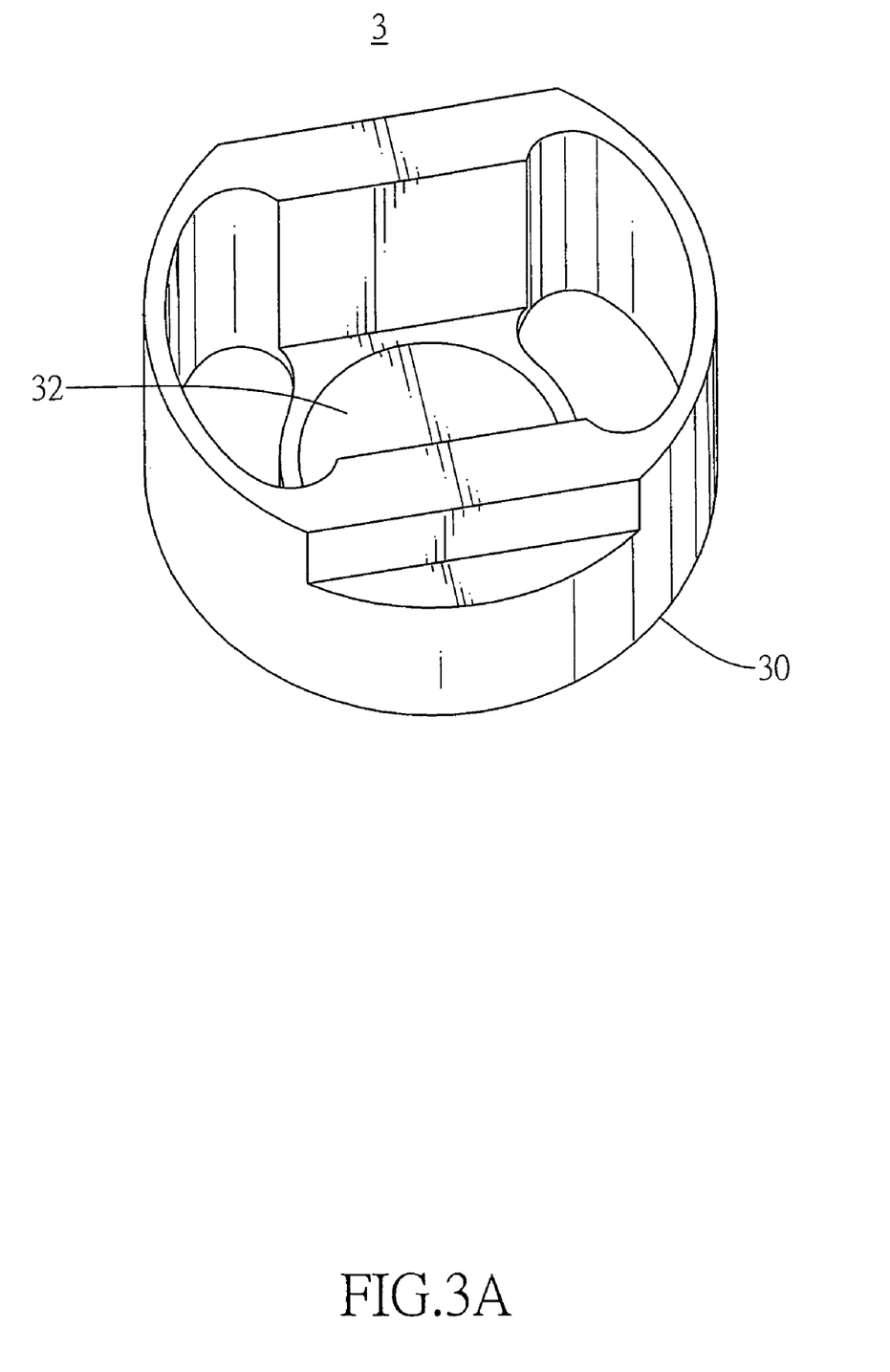
FIG. 3A is a perspective view of a second embodiment of an ultrasound transducer in accordance with the present invention.
Figure 3B:
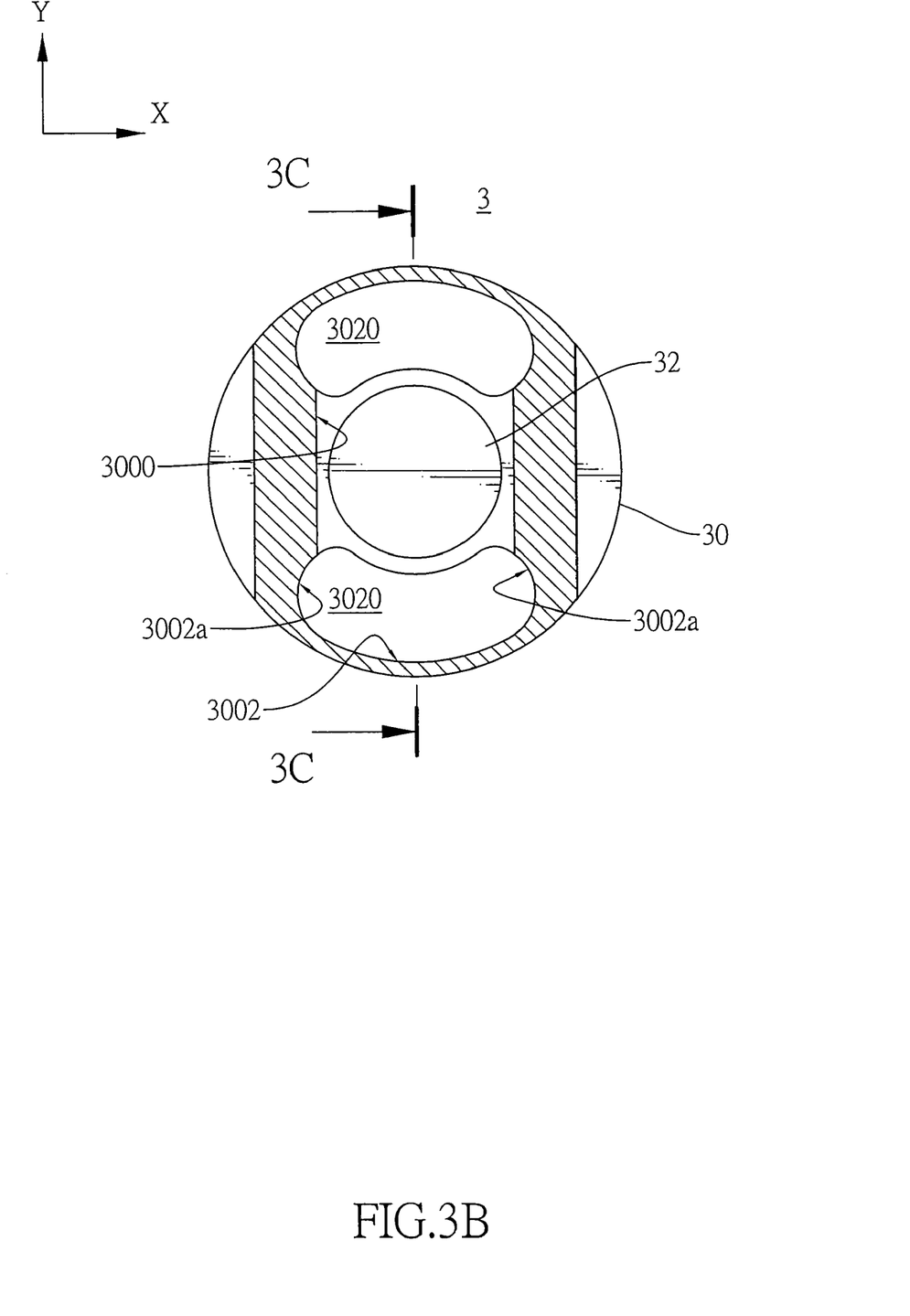
FIG. 3B is a cross sectional top view of the ultrasound transducer in FIG. 3A.
Figure 3C:
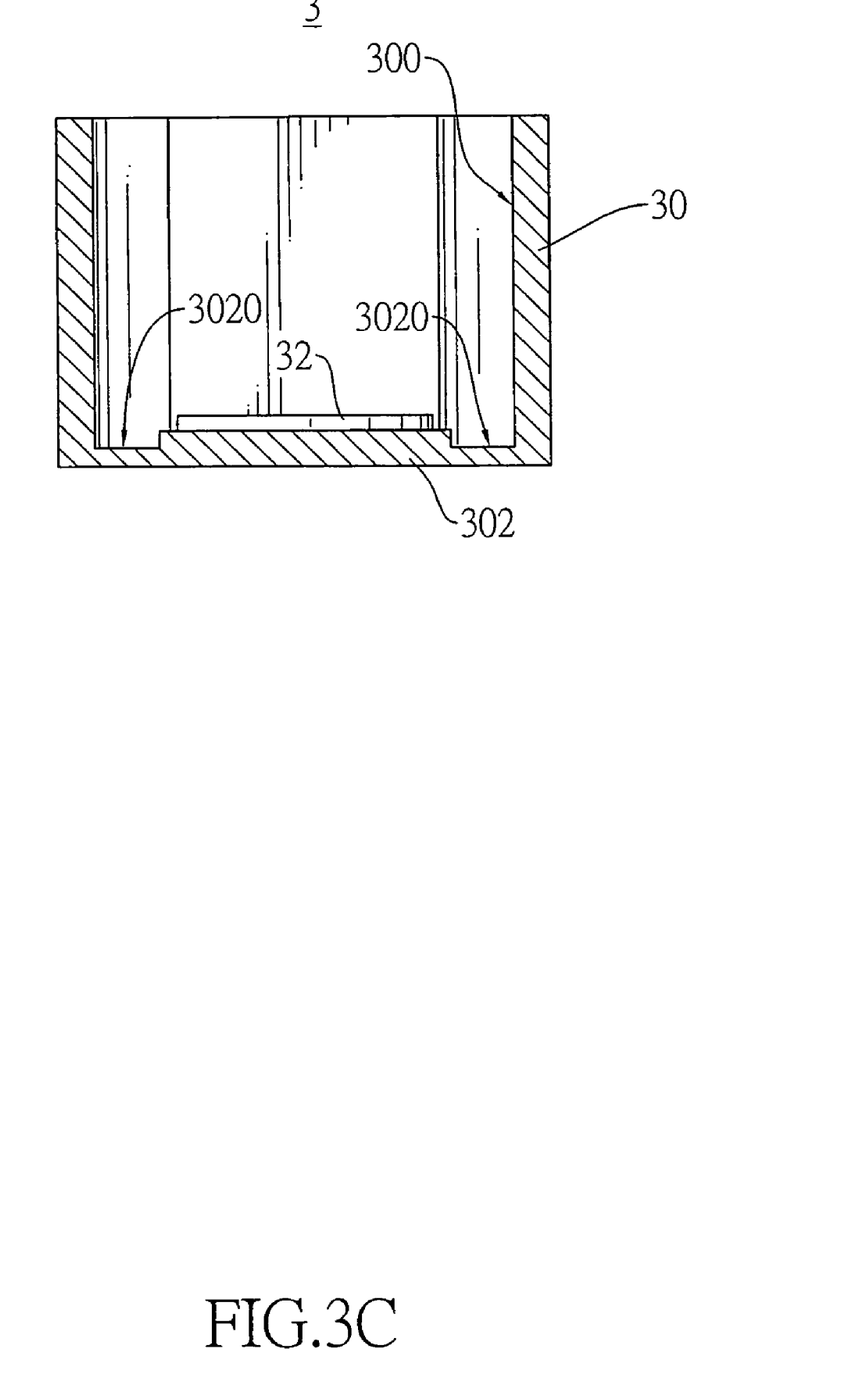
FIG. 3C is a cross sectional side view of the ultrasound transducer along line 3C-3C in FIG. 3B.

FIG. 3A shows a perspective view of a second embodiment of the ultrasound transducer (3) in accordance with the present invention. FIG. 3B shows a cross sectional top view of the ultrasound transducer (3) in FIG. 3A. FIG. 3C shows a cross sectional side view of the ultrasound transducer (3) along line 3C-3C in FIG. 3B.

With reference to FIGS. 3A-3C, the ultrasound transducer (3) comprises a cup-shaped casing (30) and a piezoelectric element (32). The cup-shaped casing (30) substantially comprises a cylindrical and straight-tubular-cup-shaped structure.

The bottom (302) of the cup-shaped casing (30) is flat and substantially perpendicular to the central axis of the cup-shaped casing (30). The sidewall (300) of the cup-shaped casing (30) surrounds the central axis.

The sidewall (300) surrounding a space of the cup-shaped casing (30) substantially has an outer surface being cylindrical. The inner surface of the sidewall (300) has a dumbbell-shaped contour when observed along the central axis.

The inner surface of the sidewall (300) has the closed dumbbell-shaped contour. The dumbbell-shaped contour has a pair of opposite straight-line sections that are substantially parallel to a longitudinal axis of the dumbbell-shaped contour. The straight-line sections stretch along the central axis to form two opposite flat surfaces (3000) of the inner surface of the sidewall (300).

The dumbbell-shaped contour of the sidewall (300) has a pair of opposite arc sections. The arc sections are located respectively at two ends of the longitudinal axis of the dumbbell-shaped contour and respectively form two enlarged portions of the dumbbell-shaped contour. The arc sections stretch along the central axis to form two opposite concave surfaces (3002) of the sidewall (300).

Moreover, two ends of each arc section of the dumbbell-shaped contour respectively joint the straight-line sections through two curve sections. Each curve section is connected to one end of the arc section and one straight-line section. The curve sections on each arc section stretch along the central axis to form two opposite grooves (3002a) so that total four grooves (3002a) are formed from the four curve sections.

An outside bottom surface of the bottom (302) of the cup-shaped casing (30) is a substantially circular plane surface. An inside bottom surface of the bottom (302) facing the opening of the cup-shaped casing (30) is substantially a flat and dumbbell-shaped surface, as clearly shown in FIG. 3B. In general, the piezoelectric element (32) is mounted substantially on a center of the inside bottom surface of the bottom (302).

The second embodiment of the ultrasound transducer in FIGS. 3A-3C is different from the first embodiment in FIGS. 2A-2C by the inside bottom surface of the bottom (302). As shown in the cross sectional side view of FIG. 3C, the dumbbell-shaped surface of the bottom (302) further has two recessed portions (3020) defined respectively in two enlarged areas of the dumbbell-shaped surface. The recessed portions (3020) are sunk relative to the center of the inside bottom surface of the bottom (302) and substantially partially deepen the space of the cup-shaped casing (30).

Figure 3D:
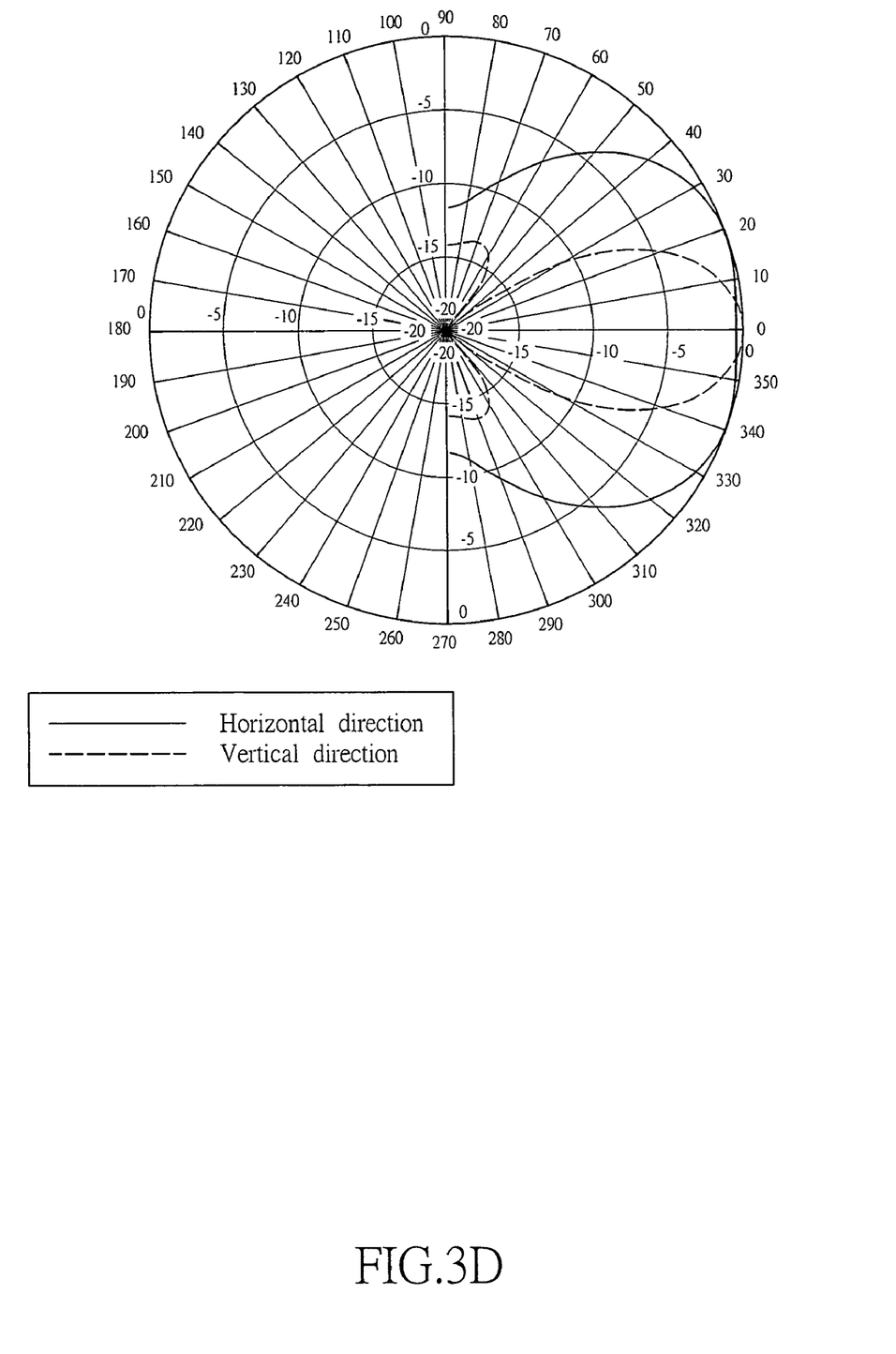
FIG. 3D is a diagram of the ultrasound coverage field pattern distributions in horizontal and vertical directions of the ultrasound transducer in FIGS. 3A-3C.

FIG. 3D shows ultrasound coverage field pattern distributions of the ultrasound transducer in horizontal and vertical directions in FIGS. 3A-3B. At the value of −3 dB, the ultrasound coverage field pattern distribution in the horizontal direction is 90 degrees and the ultrasound coverage field pattern distribution in the vertical direction is 32 degree. The ultrasound transducer of the present invention has the wider horizontal ultrasound coverage field pattern distribution and the narrower vertical ultrasound coverage field pattern distribution when compared to the first embodiment and the conventional ultrasound transducer. Therefore, the ultrasound transducer (3) of the present invention has further improvement when compared to the conventional ultrasound transducer.

Figure 4A:
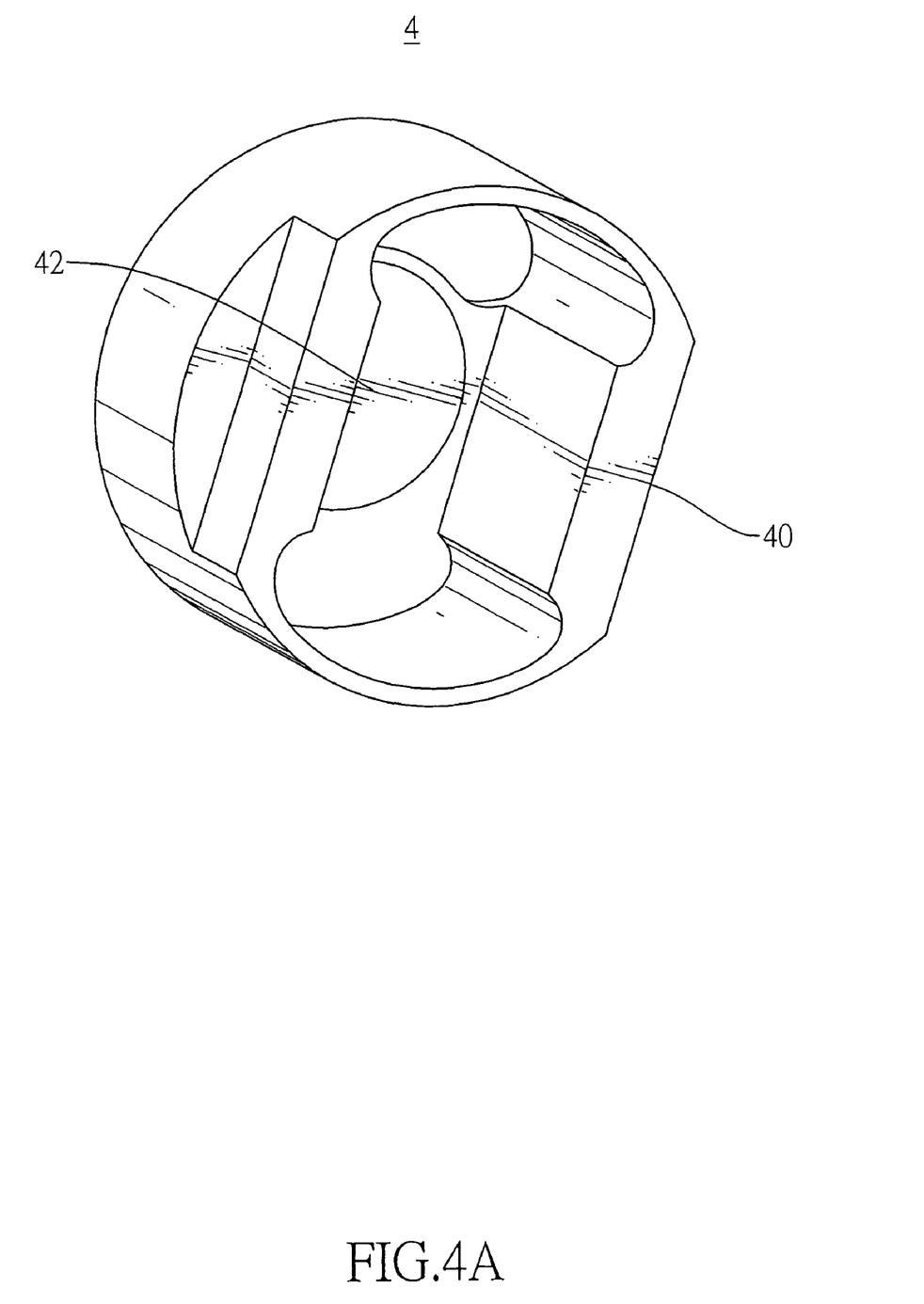
FIG. 4A is a perspective view of a third embodiment of the ultrasound transducer in accordance with the present invention.
Figure 4B:
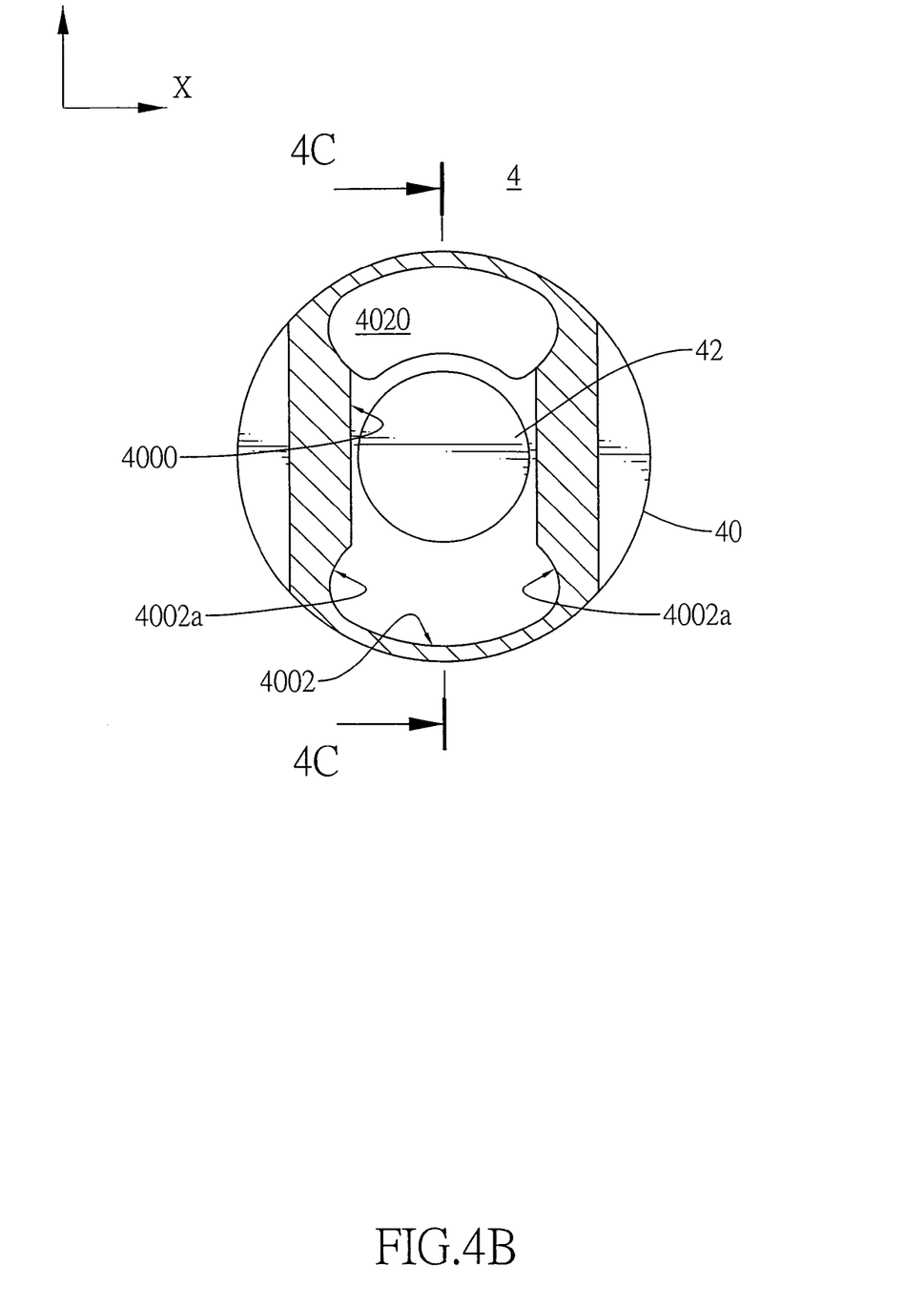
FIG. 4B is a cross sectional top view of the ultrasound transducer in FIG. 4A.
Figure 4C:
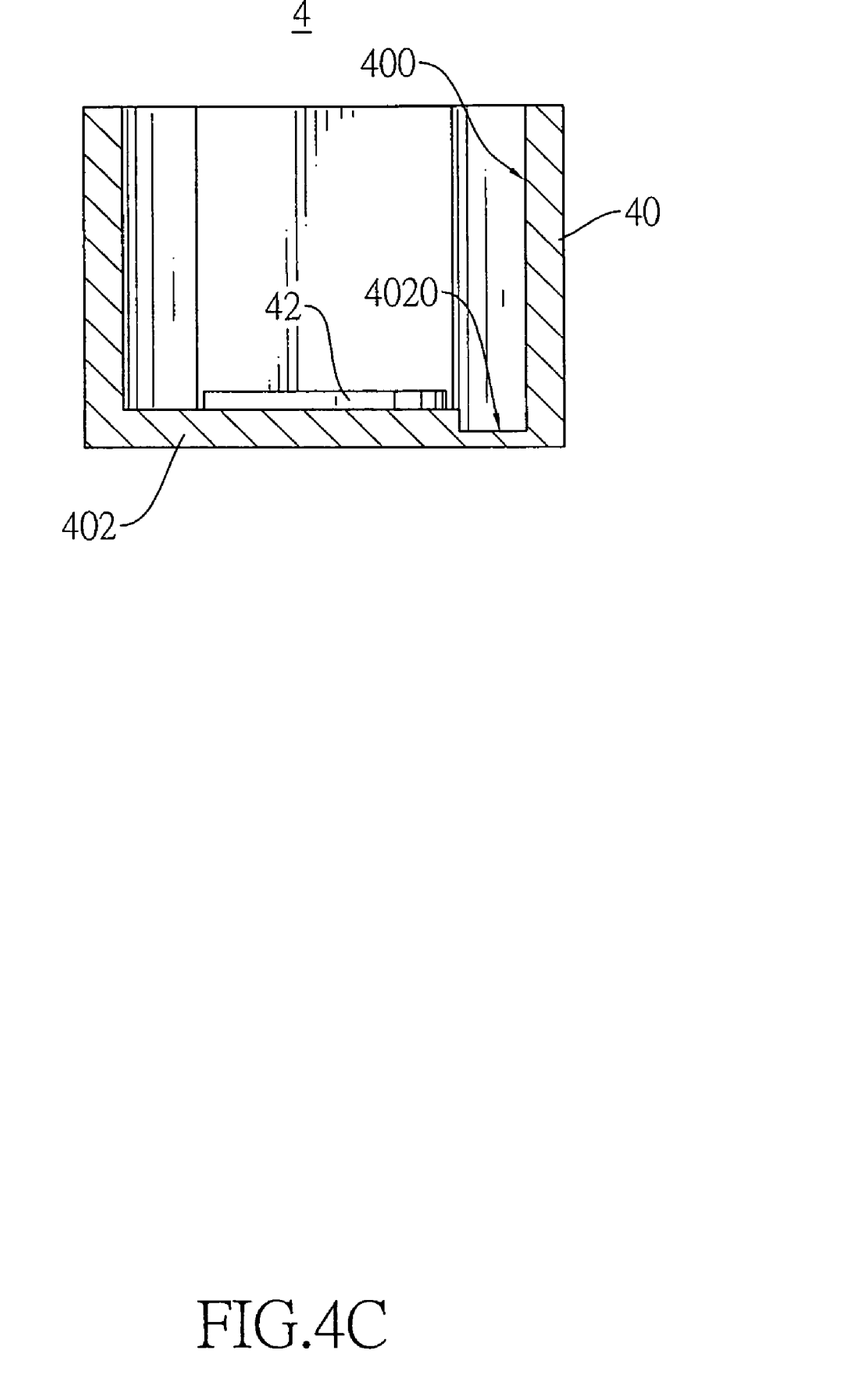
FIG. 4C is a cross sectional side view of the ultrasound transducer along 4C-4C in FIG. 4B.

FIGS. 4A-4C show a third embodiment of the ultrasound transducer (4) modified from the second embodiment in FIGS. 3A-3C. FIG. 4A shows a perspective view of the ultrasound transducer (4). FIG. 4B shows a cross sectional top view of the ultrasound transducer (4) in FIG. 4A. FIG. 4C shows a cross sectional side view of the ultrasound transducer (4) along 4C-4C in FIG. 4B. The third embodiment of FIGS. 4A-4C is substantially similar to the first and second embodiments and has similar cup-shaped casing (40) with a sidewall (400) and a piezoelectric element (42). The cup-shaped casing (40) has flat surfaces (4000), concave surfaces (4002) and grooves (4002a). The difference between the third embodiment and other embodiments is on the bottom (402). The bottom (402) has a singular recessed portion (4020) defined in one of the enlarged areas of the dumbbell-shaped surface of the bottom (402). The recessed portion (4020) substantially partially deepens the space of the cup-shaped casing (40).

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An ultrasound transducer comprising:
   a cup-shaped casing having a sidewall, wherein a cross section of an inner surface of the sidewall being perpendicular to a central axis of the ultrasound transducer substantially shows a dumbbell-shaped contour having:
   a pair of opposite straight-line sections being substantially parallel to a longitudinal axis of the dumbbell-shaped contour;
   a pair of opposite arc sections being located respectively at two ends of the longitudinal axis of the dumbbell-shaped contour and respectively forming two enlarged portions of the dumbbell-shaped contour; and
   two pairs of curve sections, wherein two ends of each arc section of the dumbbell-shaped contour respectively joint the straight-line sections through the curve sections and each curve section is connected to one end of the arc section and one straight-line section.

2. The ultrasound transducer as claimed in claim 1, wherein the cup-shaped casing further has a bottom and an inside bottom surface of the bottom facing an opening of the cup-shaped casing is substantially a flat and dumbbell-shaped surface.

3. The ultrasound transducer as claimed in claim 2, wherein the dumbbell-shaped surface of the inside bottom surface has two enlarged areas and at least one enlarged area has a recessed portion defined in the enlarged area.

* * * * *